US012280607B2

(12) United States Patent
Miyawaki

(10) Patent No.: US 12,280,607 B2
(45) Date of Patent: Apr. 22, 2025

(54) PRINTING UNIT AND PORTABLE TERMINAL

(71) Applicant: Seiko Instruments Inc., Chiba (JP)

(72) Inventor: Kouhei Miyawaki, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 71 days.

(21) Appl. No.: 18/338,698

(22) Filed: Jun. 21, 2023

(65) Prior Publication Data

US 2024/0001689 A1 Jan. 4, 2024

(30) Foreign Application Priority Data

Jun. 29, 2022 (JP) ................................ 2022-104176

(51) Int. Cl.

*B41J 3/36* (2006.01)
*B41J 2/32* (2006.01)
*B41J 29/02* (2006.01)

(52) U.S. Cl.

CPC . *B41J 3/36* (2013.01); *B41J 2/32* (2013.01); *B41J 29/02* (2013.01)

(58) Field of Classification Search

CPC ....... B41J 3/36; B41J 2/32; B41J 11/04; B41J 29/02; B41J 29/38; B41J 29/00; B41J 29/023; B41J 29/026

See application file for complete search history.

(56) References Cited

U.S. PATENT DOCUMENTS 9,365,057 B1 6/2016 Seino et al.

FOREIGN PATENT DOCUMENTS

| | | | |
|---|---|---|---|
| EP | 4005808 | A1 | 6/2022 |
| JP | 2016-159482 | A | 9/2016 |

OTHER PUBLICATIONS

Extended European Search Report in Europe application No. 23181391.6, dated Oct. 13, 2023, 7 pages.

*Primary Examiner* — Kristal Feggins
(74) *Attorney, Agent, or Firm* — Crowell & Moring LLP

(57) ABSTRACT

A printing unit includes: a platen roller, which extends in an axial direction, and is configured to convey a recording sheet; a thermal head configured to perform printing on the recording sheet through press contact with an outer peripheral surface of the platen roller; a support plate, which is arranged on a side opposite to the platen roller across the thermal head, and is configured to support the thermal head; a frame, which includes a rear plate portion arranged on a side opposite to the platen roller across the support plate, and is configured to support both ends of the support plate in the axial direction; at least one urging member, which is arranged between the rear plate portion and the support plate, and is configured to press the support plate to the platen roller side; and a protruding portion, which is formed on the support plate to protrude from the support plate to the rear plate portion side, and is configured to regulate displacement of a predetermined urging member of the at least one urging member, wherein a recessed portion is formed in a portion of the rear plate portion opposed to the protruding portion in a thickness direction of the support plate.

4 Claims, 9 Drawing Sheets

PRINTING UNIT AND PORTABLE TERMINAL

RELATED APPLICATIONS

This application claims priority to Japanese Patent Application No. 2022-104176 filed on Jun. 29, 2022, the entire content of which is incorporated herein by reference.

BACKGROUND OF THE INVENTION

1. Field of the Invention

The present invention relates to a printing unit and a portable terminal.

2. Description of the Related Art

Hitherto, there has been known a printing unit that performs printing on a heat sensitive sheet (see, for example, JP 2016-159482 A). This printing unit is configured to perform printing by heating a printing surface of a recording sheet with heating elements of a thermal head to develop a color on the printing surface while feeding the recording sheet through rotation of a platen roller under a state in which the recording sheet is nipped between the platen roller and the thermal head.

The related-art printing unit described above includes a thermal head, a support plate, a platen roller, a frame, and an elastic member. The thermal head is fixed to the support plate. The frame supports the platen roller and the support plate. The elastic member is arranged in a gap between the support plate and the frame, and presses the support plate to the platen roller side. The elastic member applies a predetermined head pressing force between the platen roller and the thermal head.

However, in the related-art printing unit described above, there is the gap between the support plate and the frame, and hence the support plate may bend. Thus, when an impact is given to the printing unit at the time of, for example, falling, the support plate bends and the thermal head is distorted, which may cause breakage of the thermal head.

Accordingly, the present invention provides a printing unit having excellent impact resistance, and a portable terminal including the printing unit.

SUMMARY OF THE INVENTION

According to one embodiment of the present invention, there is provided a printing unit includes: a platen roller, which extends in an axial direction, and is configured to convey a recording sheet; a thermal head configured to perform printing on the recording sheet through press contact with an outer peripheral surface of the platen roller; a support plate, which is arranged on a side opposite to the platen roller across the thermal head, and is configured to support the thermal head; a frame, which includes a rear plate portion arranged on a side opposite to the platen roller across the support plate, and is configured to support both ends of the support plate in the axial direction; at least one urging member, which is arranged between the rear plate portion and the support plate, and is configured to press the support plate to the platen roller side; and a protruding portion, which is formed on the support plate to protrude from the support plate to the rear plate portion side, and is configured to regulate displacement of a predetermined urging member of the at least one urging member, wherein a recessed portion is formed in a portion of the rear plate portion opposed to the protruding portion in a thickness direction of the support plate.

In the above-mentioned thermal printer according to the one embodiment of the present invention, wherein the at least one urging member includes three or more urging members arrayed in the axial direction, and wherein the protruding portion regulates displacement of, among the at least one urging member, an urging member other than urging members arranged at both ends in the axial direction.

In the above-mentioned thermal printer according to the one embodiment of the present invention, wherein the at least one urging member includes a plurality of and an odd number of urging members, and wherein the protruding portion regulates displacement of, among the at least one urging member, an urging member arranged in a middle as counted from the urging members arranged at the both ends in the axial direction.

In the above-mentioned thermal printer according to the one embodiment of the present invention, wherein the recessed portion has a depth larger than a height of the protruding portion.

In the above-mentioned thermal printer according to the one embodiment of the present invention, wherein when the support plate bends so that the protruding portion enters the recessed portion, under a state in which the protruding portion is held in non-contact with the rear plate portion, the support plate is brought into contact with a portion of the rear plate portion outside the recessed portion.

According to one embodiment of the present invention, there is provided a portable terminal includes the above printing unit.

DETAILED DESCRIPTION OF THE PREFERRED EMBODIMENTS

Now, an embodiment of the present invention is described with reference to the drawings. In the following description, components having the same or similar function are denoted by the same reference symbols. In some cases, overlapping description of the components is omitted.

(Portable Terminal)

Figure 1:
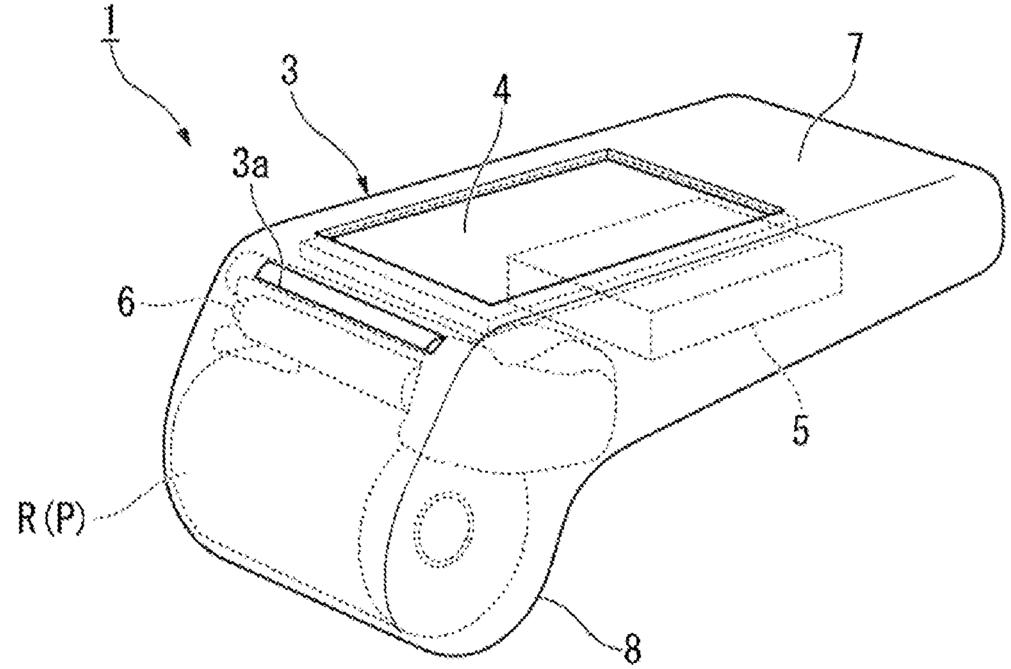
FIG. 1 is a perspective view for illustrating a portable terminal according to at least one embodiment of the present invention.

FIG. 1 is a perspective view for illustrating a portable terminal according to at least one embodiment of the present invention.

As illustrated in FIG. 1, a portable terminal 1 is capable of performing printing on a recording sheet P. The recording sheet P is a heat sensitive sheet that develops a color when heat is applied thereto, and is used suitably for printing a variety of labels, receipts, and tickets. The recording sheet P is set in the portable terminal 1 in a state of a roll sheet R obtained by rolling the recording sheet P so as to have a hollow hole, and printing is performed on a part drawn from the roll sheet R.

The portable terminal 1 includes a casing 3, a display unit 4, a control unit 5, and a printing unit 6.

The casing 3 formed into a hollow box-shape is made of a metal material or plastic such as ABS or a composite material of ABS and polycarbonate. The casing 3 includes a main body portion 7 having a rectangular parallelepiped shape, and a roll sheet receiving portion 8 formed at one end portion of the main body portion 7 in a longitudinal direction thereof so as to be bent toward one side of a thickness direction of the main body portion 7. The printing unit 6 is received at the one end portion of the main body portion 7 in the longitudinal direction. A discharge port 3*a* is formed in one end surface of the main body portion 7 in the longitudinal direction. The discharge port 3*a* is configured to discharge the recording sheet P printed by passing through the printing unit 6. The display unit 4 is arranged on a main surface of the main body portion 7, which faces the other side in the thickness direction. The display unit 4 is, for example, a liquid crystal panel. The display unit 4 is connected to the control unit 5, and is configured to display various kinds of information. The roll sheet receiving portion 8 is configured to receive the roll sheet R. The printing unit 6 is a so-called thermal printer.

(Printing Unit)

Figure 2:
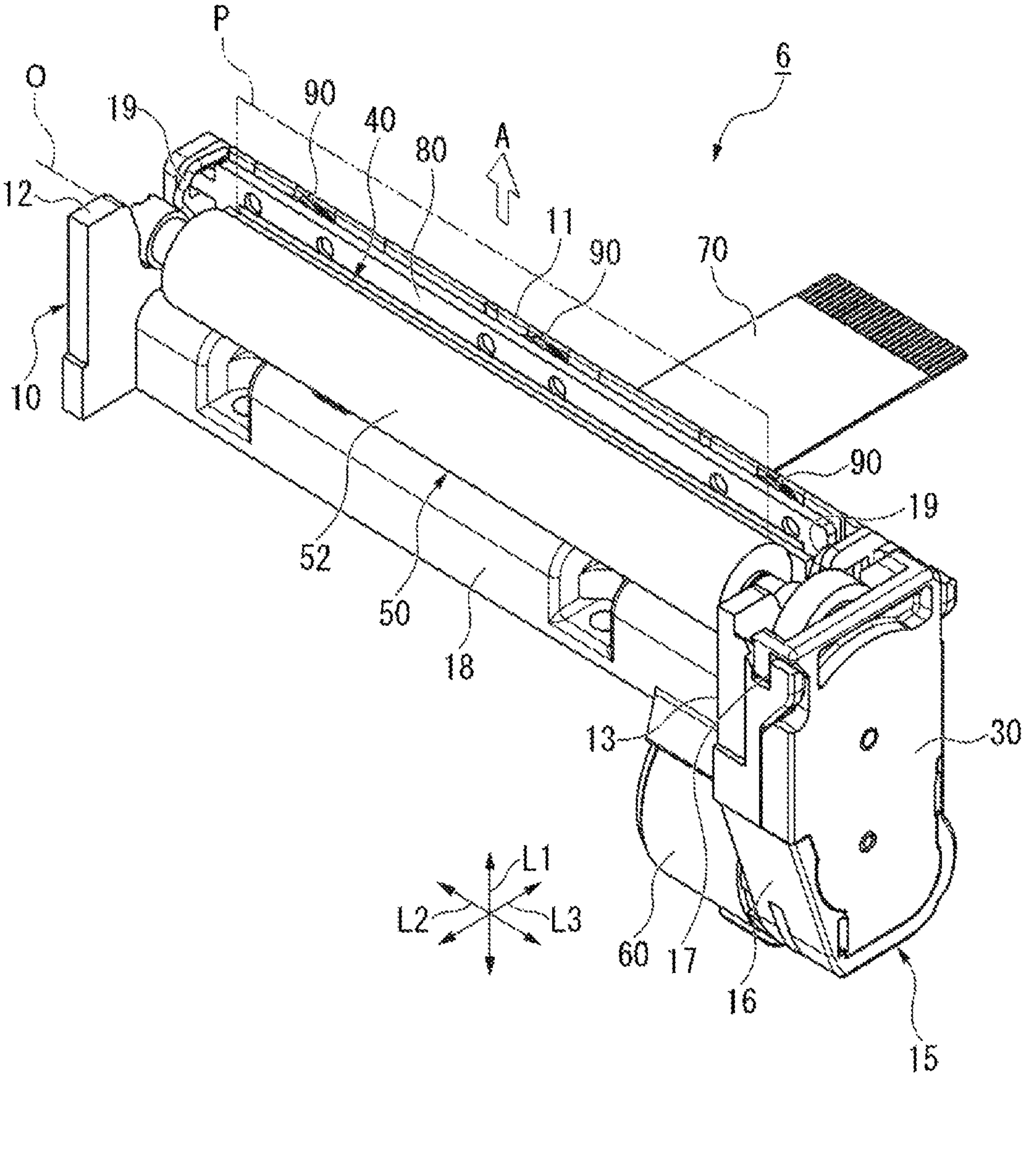
FIG. 2 is a perspective view for illustrating a printing unit according to the embodiment.
Figure 3:
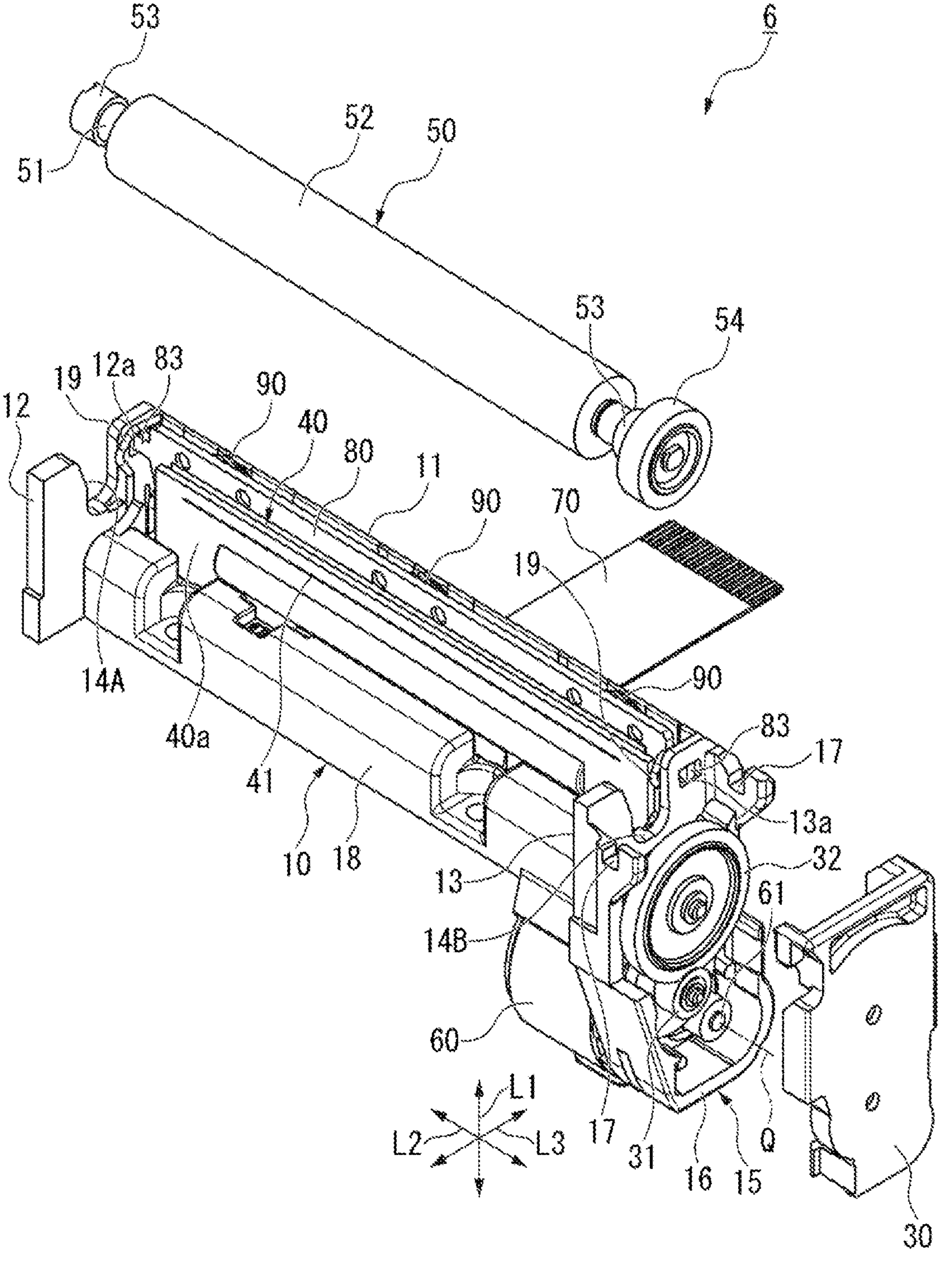
FIG. 3 is an exploded perspective view for illustrating the printing unit according to the embodiment.

FIG. 2 is a perspective view for illustrating a printing unit according to the embodiment. FIG. 3 is an exploded perspective view for illustrating the printing unit according to the embodiment.

As illustrated in FIG. 2 and FIG. 3, the printing unit 6 includes a platen roller 50, a thermal head 40, a head support plate 80 (support plate), a main body frame 10 (frame), urging members 90, a motor 60, a first reduction gear 31, and a second reduction gear 32. The platen roller 50 conveys the recording sheet P. The thermal head 40 performs printing on the recording sheet P through press contact with an outer peripheral surface of the platen roller 50. The head support plate 80 is arranged on a side opposite to the platen roller 50 across the thermal head 40, and supports the thermal head 40. The main body frame 10 includes a rear plate portion 11 arranged on a side opposite to the platen roller 50 across the head support plate 80, and supports the platen roller 50 and the head support plate 80. The urging members 90 urge the head support plate 80. The motor 60 rotates the platen roller 50 about a rotation axis O. The first reduction gear 31 and the second reduction gear 32 reduce a driving force of the motor 60, and transmit the driving force to a driven gear 54 fixed to the platen roller 50.

As illustrated in FIG. 2, the printing unit 6 is configured to convey the recording sheet P passing between the platen roller 50 and the thermal head 40 in a direction indicated by an arrow A. Mainly in the description for the printing unit 6 below, a direction along the arrow A is defined as a vertical direction L1, and the direction indicated by the arrow A is defined as an upper side. Further, a direction which is orthogonal to the vertical direction L1 and matches an axial direction of the platen roller 50 is defined as a horizontal direction L2. In addition, a direction orthogonal to the vertical direction L1 and the horizontal direction L2 is defined as a fore-and-aft direction L3, and the platen roller 50 side with respect to the thermal head 40 in the fore-and-aft direction L3 is defined as a front side.

Figure 4:
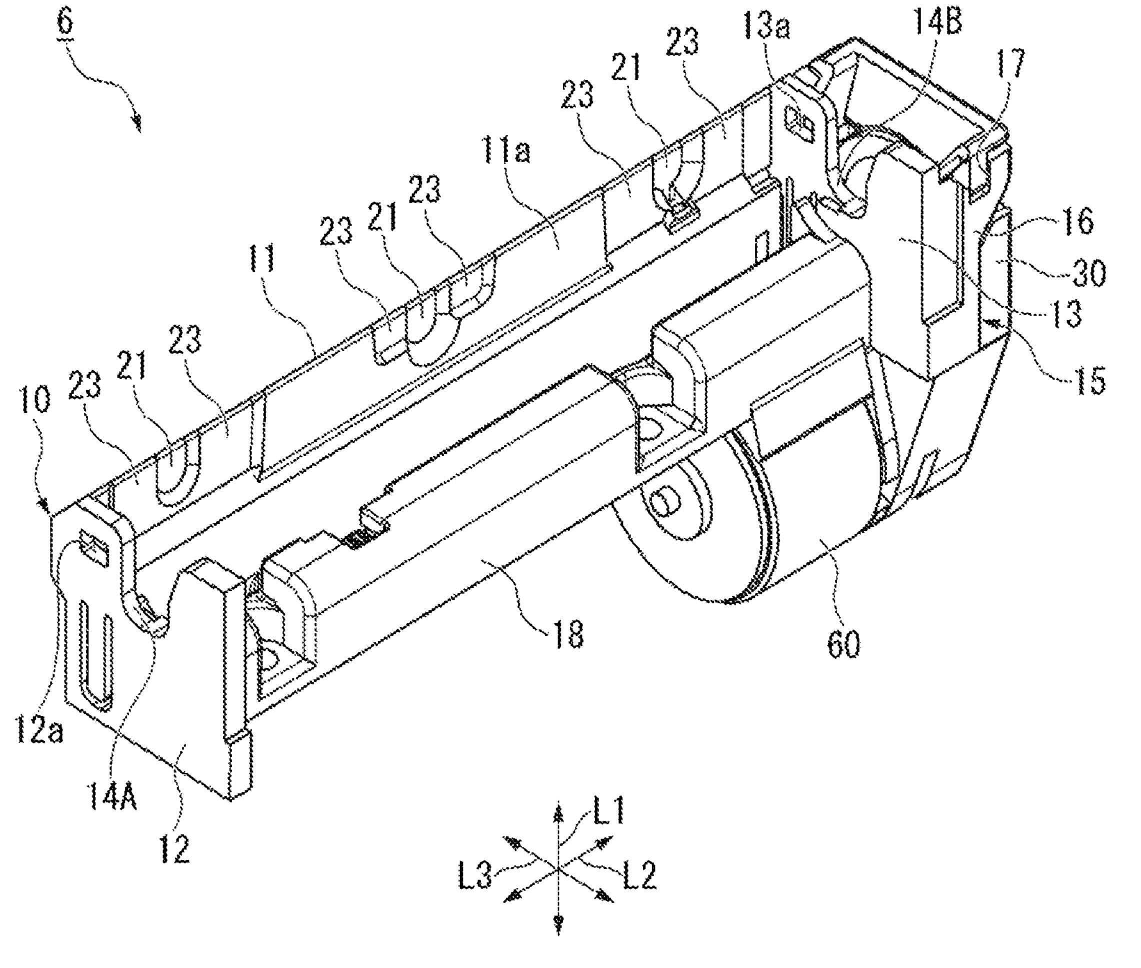
FIG. 4 is a perspective view for illustrating part of the printing unit according to the embodiment.
Figure 5:
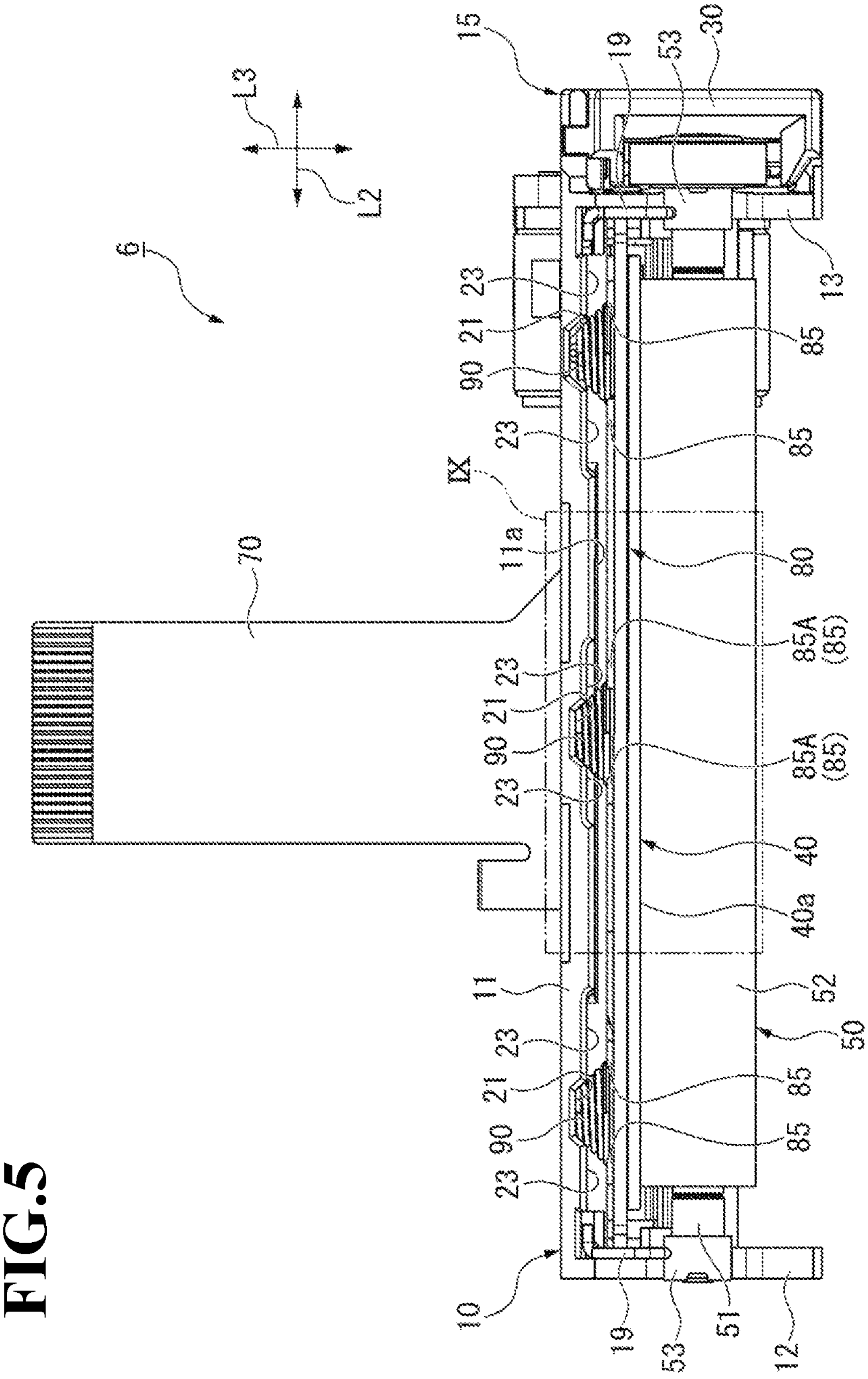
FIG. 5 is a view for illustrating the printing unit according to the embodiment when viewed from above.

FIG. 4 is a perspective view for illustrating part of components of the printing unit according to the embodiment. FIG. 5 is a view for illustrating the printing unit according to the embodiment when viewed from above.

As illustrated in FIG. 3 to FIG. 5, the main body frame 10 is formed into a U-shape opened toward the front side when viewed in the vertical direction L1. Specifically, the main body frame 10 includes a rear plate portion 11 extending in the horizontal direction L2, a first side wall portion 12 formed upright from one (left) end portion of the rear plate portion 11 in the horizontal direction L2 toward the front side, a second side wall portion 13 formed upright from another (right) end portion of the rear plate portion 11 in the horizontal direction L2 toward the front side, and a sheet guide portion 18 formed between the first side wall portion 12 and the second side wall portion 13. The rear plate portion 11, the first side wall portion 12, the second side wall portion 13, and the sheet guide portion 18 are integrally formed of, for example, a polycarbonate resin containing glass fibers.

The rear plate portion 11 is formed into a plate shape having a thickness in the fore-and-aft direction L3. The first side wall portion 12 is formed into a plate shape having a thickness in the horizontal direction L2. A portion of an upper edge of the first side wall portion 12 is cut downward to form a first roller insertion groove 14A. The second side wall portion 13 is formed into a plate shape having a thickness in the horizontal direction L2. A portion of an upper edge of the second side wall portion 13 is cut downward to form a second roller insertion groove 14B. The first roller insertion groove 14A and the second roller insertion groove 14B are formed so as to match each other when viewed in the horizontal direction L2. The platen roller 50 is removably inserted into the first roller insertion groove 14A and the second roller insertion groove 14B.

Figure 6:
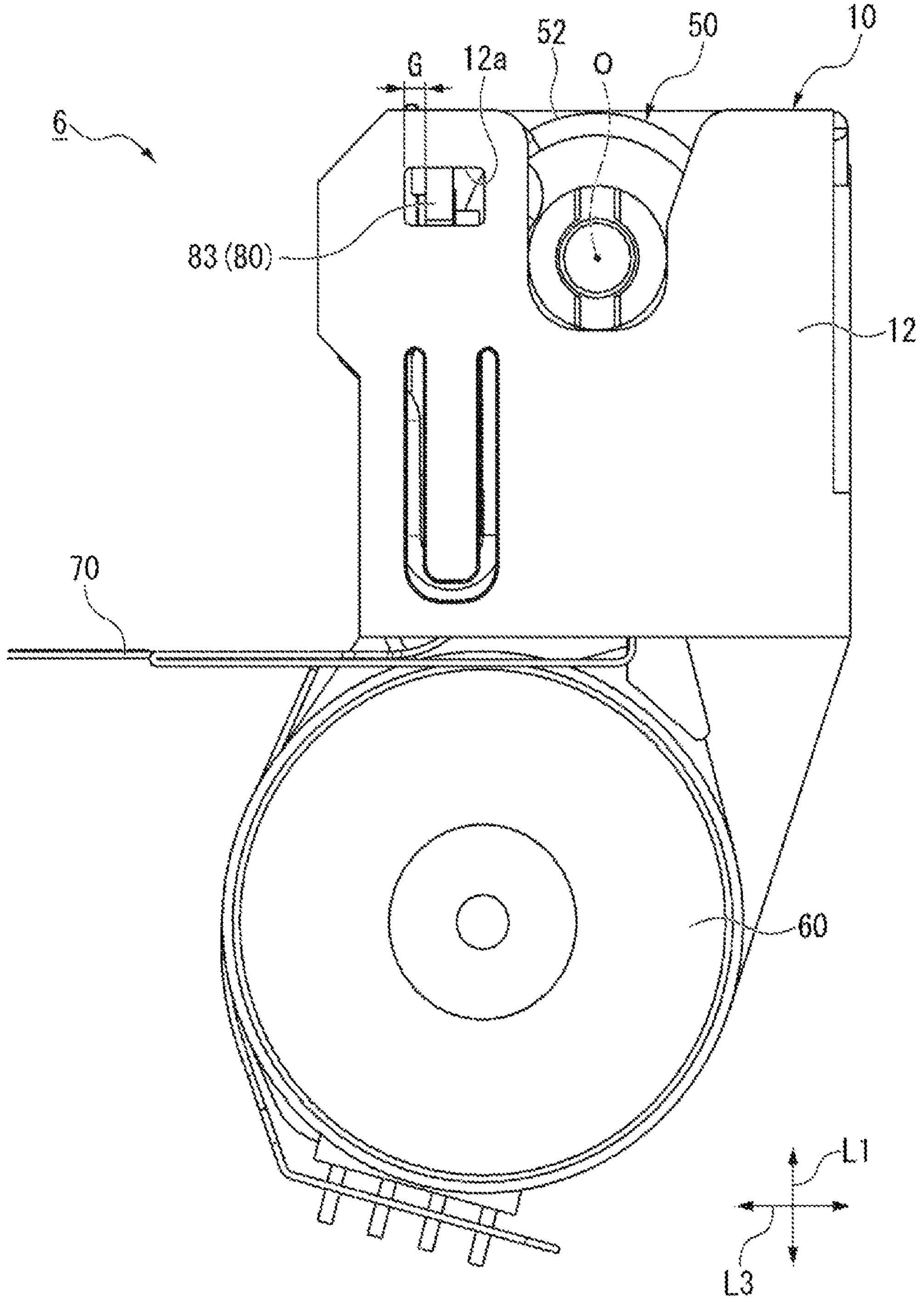
FIG. 6 is a view for illustrating the printing unit according to the embodiment when viewed from a left side thereof.

FIG. 6 is a view for illustrating the printing unit according to the embodiment when viewed from a left side thereof.

As illustrated in FIG. 4 and FIG. 6, a hole portion 12*a* is formed in the first side wall portion 12. A hole portion 13*a* is formed in the second side wall portion 13. The hole portions 12*a* and 13*a* are formed so as to match each other when viewed in the horizontal direction L2. The hole portions 12*a* and 13*a* are each formed into a rectangular shape having a pair of sides extending in the fore-and-aft direction L3 and the remaining pair of sides extending in the vertical direction L1 when viewed in the horizontal direction L2.

As illustrated in FIG. 3 and FIG. 4, the sheet guide portion 18 is formed into a column shape extending along the horizontal direction L2. A left end portion of the sheet guide portion 18 is connected to an inner surface of the first side wall portion 12. A right end portion of the sheet guide portion 18 is connected to an inner surface of the second side wall portion 13.

As illustrated in FIG. 3, a gearbox portion 15 is formed on an outer side of the second side wall portion 13. The gearbox portion 15 includes a peripheral wall portion 16 formed to extend upright from a peripheral edge of the second side wall portion 13 toward the outer side in the horizontal direction L2. That is, the gearbox portion 15 is formed of the second side wall portion 13 and the peripheral wall portion 16, and is opened toward the outer side in the horizontal direction L2. The peripheral wall portion 16 is opened upward when viewed in the horizontal direction L2. The peripheral wall portion 16 includes a pair of locking recessed portions 17 formed so as to be recessed downward. The pair of locking recessed portions 17 are formed on both front and rear sides of an upper opening of the peripheral wall portion 16, respectively. A gear cover 30 is engaged with the pair of locking recessed portions 17. The gear cover 30 covers an inner side of the gearbox portion 15 from an outer side thereof in the horizontal direction L2. The first reduction gear 31 and the second reduction gear 32 which mesh with each other are assembled inside the gearbox portion 15 so as to be rotatable.

The motor 60 generates torque about an output axis Q. The motor 60 is arranged so that the output axis Q is parallel to the rotation axis O of the platen roller 50 (see FIG. 2). The motor 60 is arranged on a side opposite to the platen roller 50 across the sheet guide portion 18 and below the rear plate portion 11. The motor 60 is fixed to an inner surface of the second side wall portion 13 in the horizontal direction L2. An output shaft 61 of the motor 60 passes through the second side wall portion 13. The output shaft 61 meshes with the first reduction gear 31 inside the gearbox portion 15. A flexible printed board 70 is connected to the motor 60. The motor 60 is electrically connected to the control unit 5 (see FIG. 1) via the flexible printed board 70. The motor 60 is configured to be driven based on a signal from the control unit 5.

The thermal head 40 is configured to perform printing on the recording sheet P (see FIG. 2). The thermal head 40 is arranged in front of the rear plate portion 11. The thermal head 40 is formed into a rectangular shape having its longitudinal direction defined as the horizontal direction L2 when viewed in the fore-and-aft direction L3. The thermal head 40 is arranged under a state in which a thickness direction of the thermal head 40 matches the fore-and-aft direction L3. A head surface 40*a* of the thermal head 40 faces a side opposite to the rear plate portion 11 (front side). On the head surface 40*a* of the thermal head 40, a large number of heating elements 41 are arrayed in the horizontal direction L2.

The head surface 40*a* is opposed to a printing surface of the recording sheet P, and the recording sheet P can be nipped between the head surface 40*a* and the outer peripheral surface of the platen roller 50. The thermal head 40 is connected to the control unit 5 (see FIG. 1) through intermediation of the flexible printed board 70. A driver IC (not shown) mounted on the thermal head 40 is configured to control heat generation of the heating elements 41 based on the signal from the control unit 5. Through the control of the heat generation of the heating elements 41, the thermal head 40 prints, for example, various kinds of letters and figures on the printing surface of the recording sheet P. The thermal head 40 is fixed to the head support plate 80 by being bonded onto a front surface of the head support plate 80 with use of, for example, a double-sided tape.

The head support plate 80 is arranged in front of the rear plate portion 11 and behind the sheet guide portion 18. The head support plate 80 is arranged between the first side wall portion 12 and the second side wall portion 13. The head support plate 80 is made of a metal material. The head support plate 80 is a plate-like member having its longitudinal direction defined as the horizontal direction L2. The head support plate 80 is arranged under a state in which a thickness direction of the head support plate 80 matches the fore-and-aft direction L3. The head support plate 80 extends in the horizontal direction L2 and the vertical direction L1 so as to have a constant thickness over an entire region of the head support plate 80 excluding protruding portions 85 to be described later. The thermal head 40 is fixed to the front surface of the head support plate 80. An intermediate position of the thermal head 40 in the horizontal direction L2 matches an intermediate position of the head support plate 80 in the horizontal direction L2.

Figure 7:
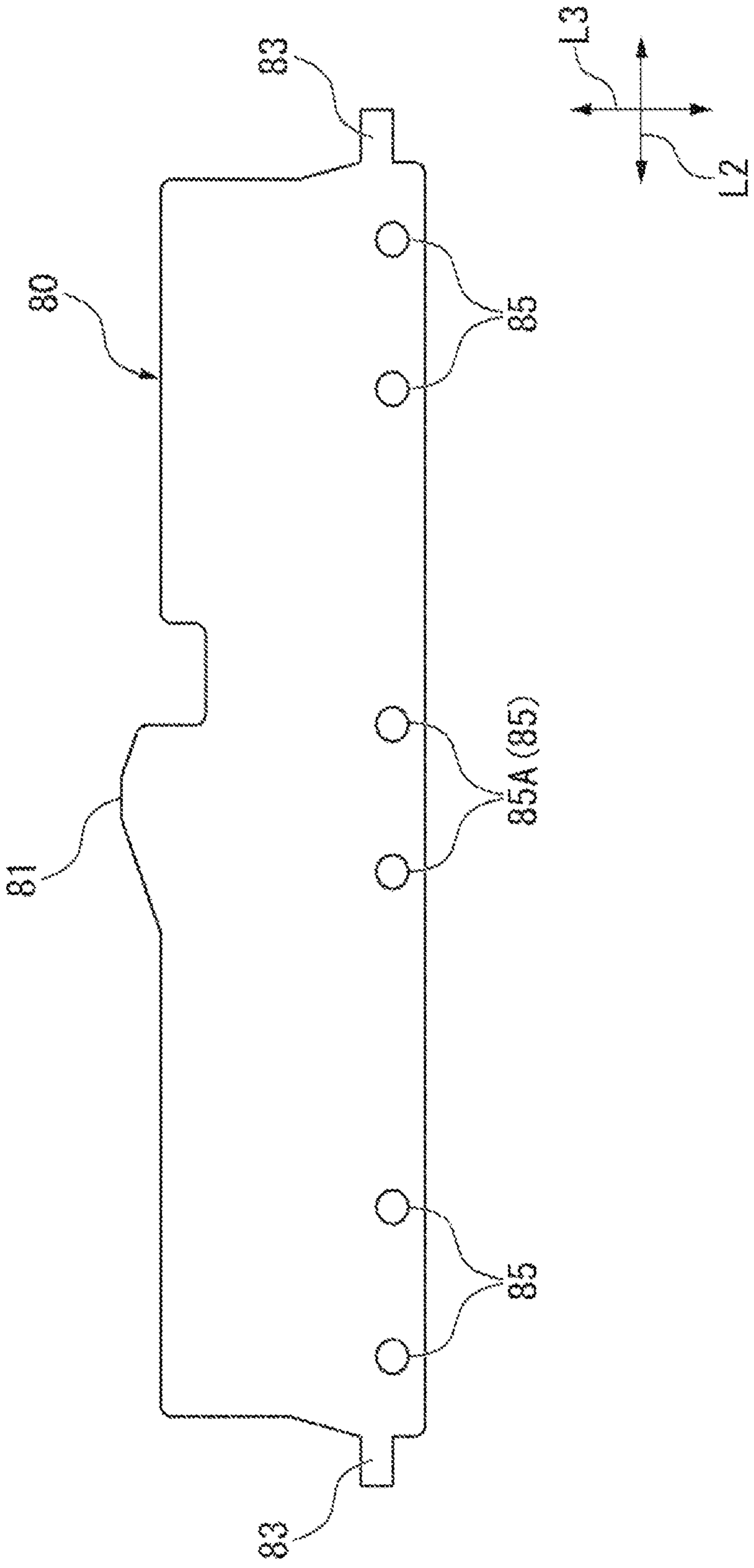
FIG. 7 is a plan view for illustrating a head support plate in the embodiment.

FIG. 7 is a plan view for illustrating the head support plate in the embodiment.

As illustrated in FIG. 7, the head support plate 80 includes a fixed portion 81 and a pair of stoppers 83.

The fixed portion 81 is formed at a lower portion of the head support plate 80. The fixed portion 81 is located at a center portion of the head support plate 80 in the horizontal direction L2, and protrudes downward. The fixed portion 81 is sandwiched between the rear plate portion 11 and the sheet guide portion 18 of the main body frame 10, and thus displacement of the fixed portion 81 in the fore-and-aft direction L3 with respect to the main body frame 10 is substantially regulated. The head support plate 80 is pivotable about the fixed portion 81 so that an upper portion of the head support plate 80 is moved in the fore-and-aft direction.

As illustrated in FIG. 3 and FIG. 7, the pair of stoppers 83 are formed at an upper end portion of the head support plate 80. Each of the pair of stoppers 83 protrudes outward in the horizontal direction L2 so as to have a substantially constant width when viewed in the fore-and-aft direction L3. The stoppers 83 are inserted into the hole portions 12*a* and 13*a* of the main body frame 10, respectively. The stopper 83 is inserted with a gap in the fore-and-aft direction L3 with respect to an inner wall surface of a corresponding one of the hole portions 12*a* and 13*a*. The stoppers 83 are movable in the fore-and-aft direction L3 inside the hole portions 12*a* and 13*a*, respectively, along with pivot of the head support plate 80, and may be brought into contact with the inner wall surfaces of the hole portions 12*a* and 13*a*, respectively. Through the contact of the stoppers 83 with the inner wall surfaces of the hole portions 12*a* and 13*a*, the pivot amount of the head support plate 80 is regulated. A rear gap G (see FIG. 6) between the stopper 83 and the inner wall surface of the hole portion 12*a* or the inner wall surface of the hole portion 13*a* is set to have a size capable of preventing a portion of the head support plate 80 other than the fixed portion 81 and the stoppers 83 from being brought into contact with the main body frame 10 even when the stopper 83 is advanced and brought into contact with the inner wall surface of the hole portion 12*a* or the inner wall surface of the hole portion 13*a*.

As illustrated in FIG. 2, the platen roller 50 is supported by the main body frame 10 so as to be rotatable about the rotation axis O. The platen roller 50 is arranged so as to be opposed to the thermal head 40 under a state in which the rotation axis O matches the horizontal direction L2. The platen roller 50 is rotated about the rotation axis O under a state in which the recording sheet P is nipped between the platen roller 50 and the thermal head 40, to thereby convey the recording sheet P in the direction indicated by the arrow A.

As illustrated in FIG. 3, the platen roller 50 includes a roller shaft 51, a roller main body 52 mounted on the roller shaft 51, and a pair of bearings 53 mounted at both ends of the roller shaft 51. The roller shaft 51 is formed slightly longer than the separation distance between the first side wall portion 12 and the second side wall portion 13 of the main body frame 10. The roller main body 52 is made of, for example, rubber, and is arranged along the horizontal direction L2 uniformly over the entire region excluding portions corresponding to both the ends of the roller shaft 51.

As illustrated in FIG. 2 and FIG. 3, the pair of bearings 53 of the platen roller 50 are inserted into the first roller insertion groove 14A and the second roller insertion groove 14B of the main body frame 10, respectively. The bearings 53 are held in the first roller insertion groove 14A and the second roller insertion groove 14B by locking springs 19 supported on the main body frame 10. With this configuration, the platen roller 50 is held so as to be rotatable relative to the main body frame 10. Further, when the locking springs 19 are elastically deformed in order to insert and remove the bearings 53 into and from the first roller insertion groove 14A and the second roller insertion groove 14B, the platen roller 50 is mountable to and removable from the main body frame 10. Under a state in which the platen roller 50 is inserted into the first roller insertion groove 14A and the second roller insertion groove 14B, the platen roller 50 is arranged so that an outer peripheral surface of the roller main body 52 is brought into contact with the head surface 40*a* of the thermal head 40 while nipping the recording sheet P drawn out from the roll sheet R (see FIG. 1) between the platen roller 50 and the thermal head 40.

As illustrated in FIG. 3, the driven gear 54 is fixed on another (right) end portion of the platen roller 50 in the horizontal direction L2. The driven gear 54 is assembled to an upper part of the gearbox portion 15 when the platen roller 50 is held on the first side wall portion 12 and the second side wall portion 13. The driven gear 54 meshes with the second reduction gear 32. With this, a rotational driving force from the motor 60 is transmitted to the driven gear 54 via the first reduction gear 31 and the second reduction gear 32. The platen roller 50 is rotated under a state of being held on the first side wall portion 12 and the second side wall portion 13, thereby being capable of conveying the recording sheet P (see FIG. 2).

Figure 8:
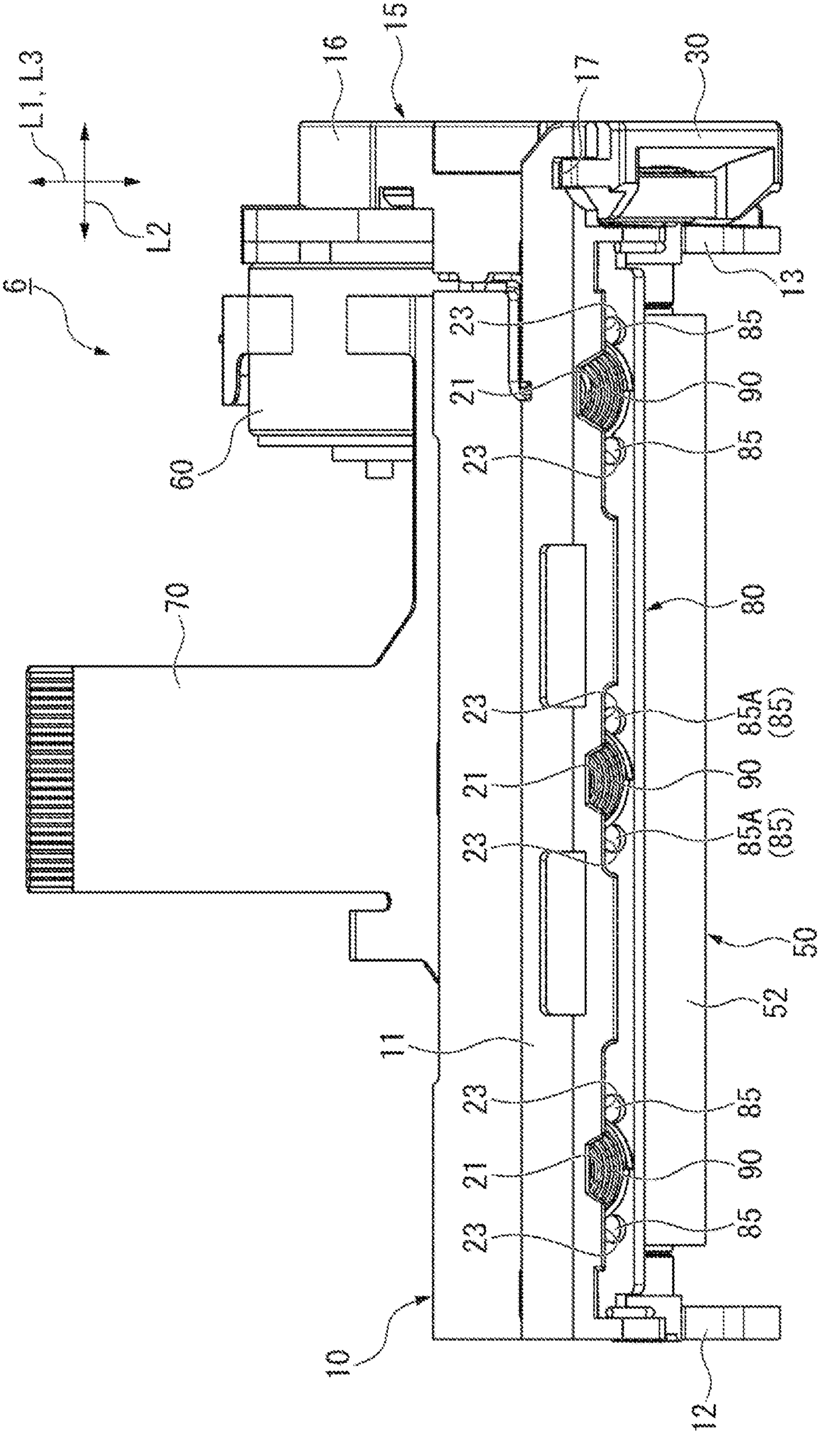
FIG. 8 is a view for illustrating the printing unit according to the embodiment when viewed from an upper rear side thereof.

FIG. 8 is a view for illustrating the printing unit according to the embodiment when viewed from an upper rear side thereof.

As illustrated in FIG. 5 and FIG. 8, each of the urging members 90 is arranged between the head support plate 80 and the rear plate portion 11. The urging member 90 urges the head support plate 80 and the rear plate portion 11 in a direction of separating the head support plate 80 and the rear plate portion 11 away from each other. The urging member 90 presses the head support plate 80 to the platen roller 50 side. The urging member 90 is a helical compression spring that is extended and compressed in the fore-and-aft direction L3. Specifically, the urging member 90 is a conical spring having a diameter decreasing from the front side to the rear side. A rear end portion of the urging member 90 is held in abutment against a front surface 11*a* of the rear plate portion 11. A front end portion of the urging member 90 is held in abutment against a surface (rear surface) of the head support plate 80 facing the rear plate portion 11 side. The urging members 90 are arranged in a bilaterally symmetric manner with respect to the intermediate position of the head support plate 80 in the horizontal direction L2. Three urging members 90 are arrayed at equal intervals in the horizontal direction L2.

As illustrated in FIG. 7 and FIG. 8, the protruding portions 85 are formed on the rear surface of the head support plate 80. Each of the protruding portions 85 is formed into a columnar shape, and protrudes from the head support plate 80 to the rear plate portion 11 side. The protruding portions 85 have the same height. The protruding portions 85 are arranged so as to overlap the rear plate portion 11 when viewed in a thickness direction (fore-and-aft direction) of the head support plate 80. A pair of the protruding portions 85 is provided for each of the urging members 90. The pair of the protruding portions 85 are provided apart from each other with an interval in the horizontal direction L2. The interval between the pair of the protruding portions 85 is smaller than a width of the front end portion of the urging member 90 in the horizontal direction L2. The pair of the protruding portions 85 can be brought into contact with the front end portion of the urging member 90 from the upper side. The pair of the protruding portions 85 are brought into contact with the front end portion of the urging member 90 so as to regulate upward movement of the urging member 90, to thereby position the urging member 90. In the following description, among the protruding portions 85, each of a pair of the protruding portions 85 corresponding to the center urging member 90 is referred to as a center protruding portion 85A in some cases. The center urging member 90 is, among all the urging members 90, one urging member 90 other than the urging members 90 arranged at both ends in the horizontal direction L2, in other words, among all the urging members 90, the urging member 90 arranged in the middle as counted from the urging members 90 arranged at the both ends in the horizontal direction L2.

Figure 9:
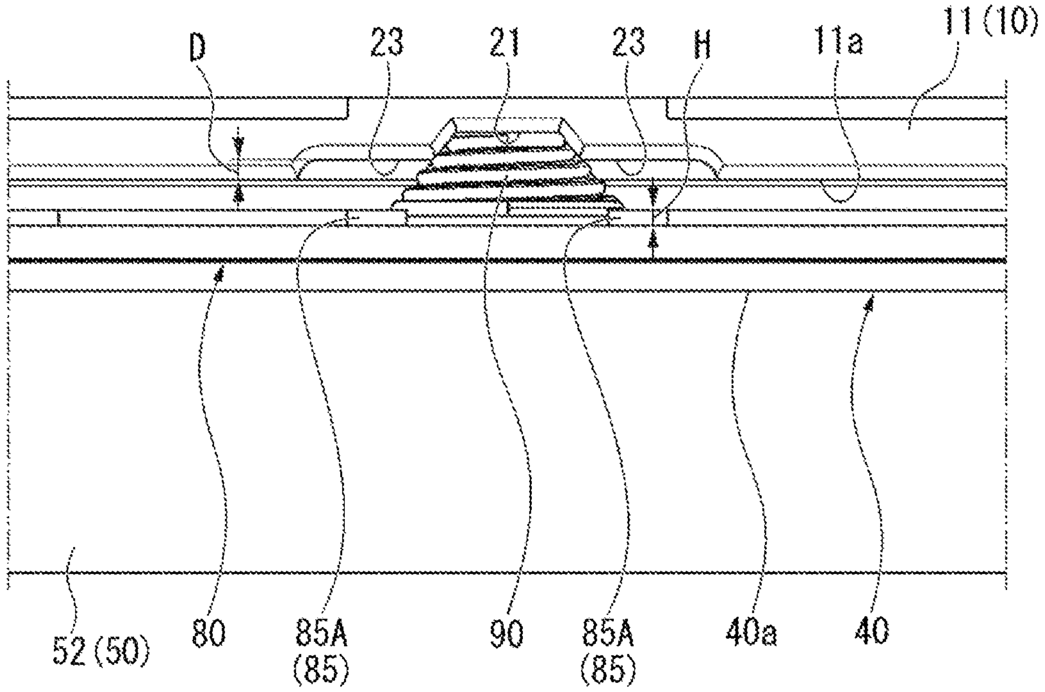
FIG. 9 is an enlarged view for illustrating a portion IX of FIG. 5.

FIG. 9 is an enlarged view for illustrating a portion IX of FIG. 5.

As illustrated in FIG. 4, FIG. 5, and FIG. 9, the rear plate portion 11 includes holding portions 21 and recessed portions 23. The holding portions 21 hold the urging members 90 therein. The recessed portions 23 are formed to prevent contact between the rear plate portion 11 and the protruding portions 85.

Each holding portion 21 is opened in the front surface 11*a* of the rear plate portion 11 and formed into a recessed shape recessed to the rear side. The holding portion 21 extends in the vertical direction L1, and is opened in an upper end surface of the rear plate portion 11. The number of the holding portions 21 is the same as the number of the urging members 90 (three in this embodiment). The rear end portion of the urging member 90 is arranged in the holding portion 21. The holding portion 21 allows entry of the rear end portion of the urging member 90 from the upper side, and regulates displacement of the rear end portion of the urging member 90 in the horizontal direction L2.

The recessed portions 23 are formed in portions of the rear plate portion 11 that are opposed to the protruding portions 85 of the head support plate 80 in the fore-and-aft direction L3 in a one-to-one relationship, respectively. The recessed portions 23 are opened in the front surface 11*a* of the rear plate portion 11 and recessed to the rear side. The recessed portions 23 are each opened continuously in a range from the front surface 11*a* to the upper end surface of the rear plate portion 11. The recessed portions 23 are formed in the rear plate portion 11 so as to include entire portions overlapping the protruding portions 85 when viewed in the fore-and-aft direction L3. With this configuration, the recessed portions 23 prevent the protruding portions 85 from being brought into contact with the rear plate portion 11 when the protruding portions 85 are displaced to the rear side.

One recessed portion 23 is formed at each side adjacent position of the holding portion 21 in the horizontal direction L2. The recessed portion 23, which receives the center protruding portion 85A, has a smaller dimension in the vertical direction than a dimension of the holding portion 21, which holds the center urging member 90 therein, in the vertical direction. Each of the recessed portions 23 communicates with the holding portion 21. In the upper end surface of the rear plate portion 11, openings of the recessed portions 23 are continuous with an opening of the holding portion 21. Opening edges of the recessed portions 23 and an opening edge of the holding portion 21 in the upper end surface of the rear plate portion 11 are chamfered. The recessed portions 23 are formed so as to be shallower than the holding portion 21 to which the recessed portions 23 are adjacent. The recessed portions 23 each have a depth larger than a height of the protruding portion 85. As illustrated in FIG. 9, a depth D of the recessed portion 23 is a depth determined with reference to the front surface 11*a* of the rear plate portion 11. A height H of the protruding portion 85 is a height determined with reference to the rear surface of the head support plate 80.

Operations of the above-mentioned printing unit 6 are described.

When an impact is given to the printing unit 6 at the time of, for example, falling, inertia acts on the head support plate 80, and thus the head support plate 80 is brought to be momentarily displaced with respect to the main body frame 10. Depending on an orientation of the falling, the head support plate 80 is displaced with respect to the main body frame 10 so as to reduce the gaps between the stoppers 83 of the head support plate 80 and the inner wall surfaces of the hole portions 12*a* and 13*a* of the main body frame 10. Further, under a state in which displacement of the stoppers 83 with respect to the main body frame 10 is regulated, both ends of the head support plate 80 in the horizontal direction L2 substantially serve as fixed ends, and thus the head support plate 80 bends. In this case, a displacement amount at a center portion of the head support plate 80 in the horizontal direction L2 may be maximum. In particular, the head support plate 80 is formed into a plate-like shape having a thickness in the fore-and-aft direction L3, and hence the head support plate 80 easily bends in the fore-and-aft direction L3.

The recessed portions 23 are formed in portions of the rear plate portion 11 of the main body frame 10 that are opposed to the protruding portions 85 of the head support plate 80 in the fore-and-aft direction L3, respectively. With this configuration, even when the head support plate 80 is displaced to the rear plate portion 11 side along the fore-and-aft direction L3, the recessed portions 23 receive the protruding portions 85, thereby being capable of preventing the protruding portions 85 from being brought into contact with the rear plate portion 11.

When the head support plate 80 bends so that the protruding portions 85 enter the recessed portions 23, under a state in which the protruding portions 85 are held in non-contact with the rear plate portion 11, the head support plate 80 is brought into contact with portions of the rear plate portion 11 outside the recessed portions 23. At this time, the head support plate 80 is brought into surface contact with flat portions in vicinities of the openings of the recessed portions 23 in the front surface 11*a* of the rear plate portion 11.

Here, if the head support plate is displaced due to an impact given to the printing unit, and thus the protruding portions are brought into contact with the rear plate portion, inertia acts on the head support plate continuously even after the protruding portions are brought into contact with the rear plate portion. In this case, displacement of the protruding portions is regulated by the rear plate portion, and hence the head support plate may be deformed so as to bend with a larger curvature as compared to a case in which the protruding portions are not brought into contact with the rear plate portion. According to this embodiment, the protruding portions 85 can be prevented from being brought into contact with the rear plate portion 11, and hence even when an impact is given to the printing unit 6, the head support plate 80 can be prevented from bending with a relatively large curvature. Accordingly, excessive distortion can be prevented from occurring in the thermal head 40 supported by the head support plate 80 and causing breakage of the thermal head 40. Thus, the printing unit 6 having excellent impact resistance can be provided.

Further, in this embodiment, the recessed portions 23 are formed in the portions opposed to the protruding portions 85 (center protruding portions 85A) that correspond to, among all the urging members 90, one urging member 90 other than the urging members 90 arranged at the both ends in the horizontal direction L2. When the head support plate 80 bends so that the center portion of the head support plate 80 in the horizontal direction L2 approaches the rear plate portion 11, the protruding portions 85 closer to the center portion of the head support plate 80 have larger displacement amounts. According to this embodiment, even when the head support plate 80 bends so that the center portion of the head support plate 80 in the horizontal direction L2 approaches the rear plate portion 11, the recessed portions 23 receive, among all the protruding portions 85, the protruding portions 85 having relatively large displacement amounts. Thus, the protruding portions 85 can be more reliably prevented from being brought into contact with the rear plate portion 11.

Moreover, in this embodiment, the recessed portions 23 are formed in the portions opposed to the protruding portions 85 (center protruding portions 85A) that correspond to, among all the urging members 90, the urging member 90 arranged in the middle as counted from the urging members 90 arranged at the both ends in the horizontal direction L2. With this configuration, even when the head support plate 80 bends so that the center portion of the head support plate 80 in the horizontal direction L2 approaches the rear plate portion 11, the recessed portions 23 receive, among all the protruding portions 85, the protruding portions 85 having the largest displacement amounts. Thus, the protruding portions 85 can be more reliably prevented from being brought into contact with the rear plate portion 11.

In addition, the recessed portions 23 have depths larger than the heights of the protruding portions 85, thereby being capable of preventing the protruding portions 85 from being brought into contact with bottom surfaces of the recessed portions 23.

When the head support plate 80 bends so that the protruding portions 85 enter the recessed portions 23, under a state in which the protruding portions 85 are held in non-contact with the rear plate portion 11, the head support plate 80 is brought into contact with the portions of the rear plate portion 11 outside the recessed portions 23. Thus, as compared to a case in which the protruding portions are brought into contact with the rear plate portion, a reaction force is applied to a wider range of the head support plate 80 when the head support plate 80 is brought into contact with the rear plate portion 11, thereby being capable of preventing an excessive external force from being applied to a relatively narrow range of the thermal head 40. Accordingly, occurrence of stress concentration on the thermal head 40 is avoided, thereby being capable of more effectively preventing breakage of the thermal head 40.

The portable terminal 1 according to this embodiment includes the printing unit 6 described above, and hence can be provided as a portable terminal having high durability.

The present invention is not limited to the embodiment described above with reference to the drawings, and various modification examples may be employed within the technical scope of the present invention.

For example, in the embodiment described above, the plurality of urging members 90 are provided on the printing unit 6, and the protruding portions 85 are provided for each of the urging members 90. Further, the recessed portions 23 are formed in the portions of the rear plate portion 11 opposed to the protruding portions 85, respectively. However, the present invention is not limited to this configuration. For example, only one urging member may be provided. Further, the recessed portions may be formed only in portions of the rear plate portion that are opposed to part of the protruding portions. In this case, it is desired that the part of the protruding portions include a protruding portion that regulates displacement of, among all the urging members, the urging member other than the urging members arranged at the both ends in the horizontal direction. That is, it is desired that the recessed portion be formed in a portion opposed to the protruding portion that corresponds at least to the urging member other than the urging members arranged at the both ends. In addition, when a plural of and an odd number of urging members are provided, it is further desired that the part of the protruding portions include a protruding portion that regulates displacement of, among all the urging members, the urging member arranged in the middle as counted from the urging members arranged at the both ends in the horizontal direction. That is, it is further desired that the recessed portion be formed in a portion opposed to the protruding portion that corresponds at least to the center urging member. For example, the recessed portion may be formed only in a portion opposed to the center protruding portion 85A.

In the embodiment described above, the protruding portions are each formed into a columnar shape, but the shape of each of the protruding portions is not particularly limited. Further, for one urging member, only one protruding portion may be provided or three or more protruding portions may be provided.

Besides the above, the components in the above-mentioned embodiment may be replaced by well-known components as appropriate without departing from the gist of the present invention.

What is claimed is:

1. A printing unit, comprising:

a platen roller, which extends in an axial direction, and is configured to convey a recording sheet;

a thermal head configured to perform printing on the recording sheet through press contact with an outer peripheral surface of the platen roller;

a support plate, which is arranged on a side opposite to the platen roller across the thermal head, and is configured to support the thermal head;

a frame, which includes a rear plate portion arranged on a side opposite to the platen roller across the support plate, and is configured to support both ends of the support plate in the axial direction;

at least one urging member, which is arranged between the rear plate portion and the support plate, and is configured to press the support plate to the platen roller side; and a protruding portion, which is formed on the support plate to protrude from the support plate to the rear plate portion side, and is configured to regulate displacement of a predetermined urging member of the at least one urging member, wherein a recessed portion is formed in a portion of the rear plate portion opposed to the protruding portion in a thickness direction of the support plate, wherein the recessed portion has a depth larger than a height of the protruding portion, which is capable of preventing the protruding portions from making contact with the recessed portions.

2. The printing unit according to claim 1, wherein the at least one urging member includes three or more urging members arrayed in the axial direction, and wherein the protruding portion regulates displacement of, among the at least one urging member, an urging member other than urging members arranged at both ends in the axial direction.

3. The printing unit according to claim 2, wherein the at least one urging member includes a plurality of and an odd number of urging members, and wherein the protruding portion regulates displacement of, among the at least one urging member, an urging member arranged in a middle as counted from the urging members arranged at the both ends in the axial direction.

4. The printing unit according to claim 1, wherein, when the support plate bends so that the protruding portion enters the recessed portion, the protruding portion is held in non-contact with the rear plate portion, and the support plate is brought into contact with a portion of the rear plate portion outside the recessed portion, avoiding an excessive external force from being applied to a relatively narrow range of the thermal head.

* * * * *